AUTOMATIC CONTROL APPARATUS FOR SILVER RECOVERY

Filed Feb. 23, 1968

INVENTORS
PETER B. SNOOK
OMAR E. SNYDER
BY [signature]
ATTORNEY

United States Patent Office 3,551,318

Patented Dec. 29, 1970

3,551,318

AUTOMATIC CONTROL APPARATUS FOR SILVER RECOVERY

Peter B. Snook, Los Altos, and Omar, E. Snyder, Palo Alto, Calif., assignors to W. B. Snook Mfg. Co., Inc., Palo Alto, Calif., a corporation of California Filed Feb. 23, 1968, Ser. No. 707,864

Int. Cl. B01k 3/06, 3/08

U.S. Cl. 204—228 8 Claims

ABSTRACT OF THE DISCLOSURE

Automatic control apparatus for the recovery of silver metal from a solution of silver ions by plating the silver onto a cathode. Includes an electrolytic sensing cell resting in the solution and a plating current control connected to the cell which varies the plating current inversely proportional to the cell output voltage and wherein the variations in plating current are substantially independent of the voltage between the cell and either the cathode or anode of the plating apparatus.

Figure 1:
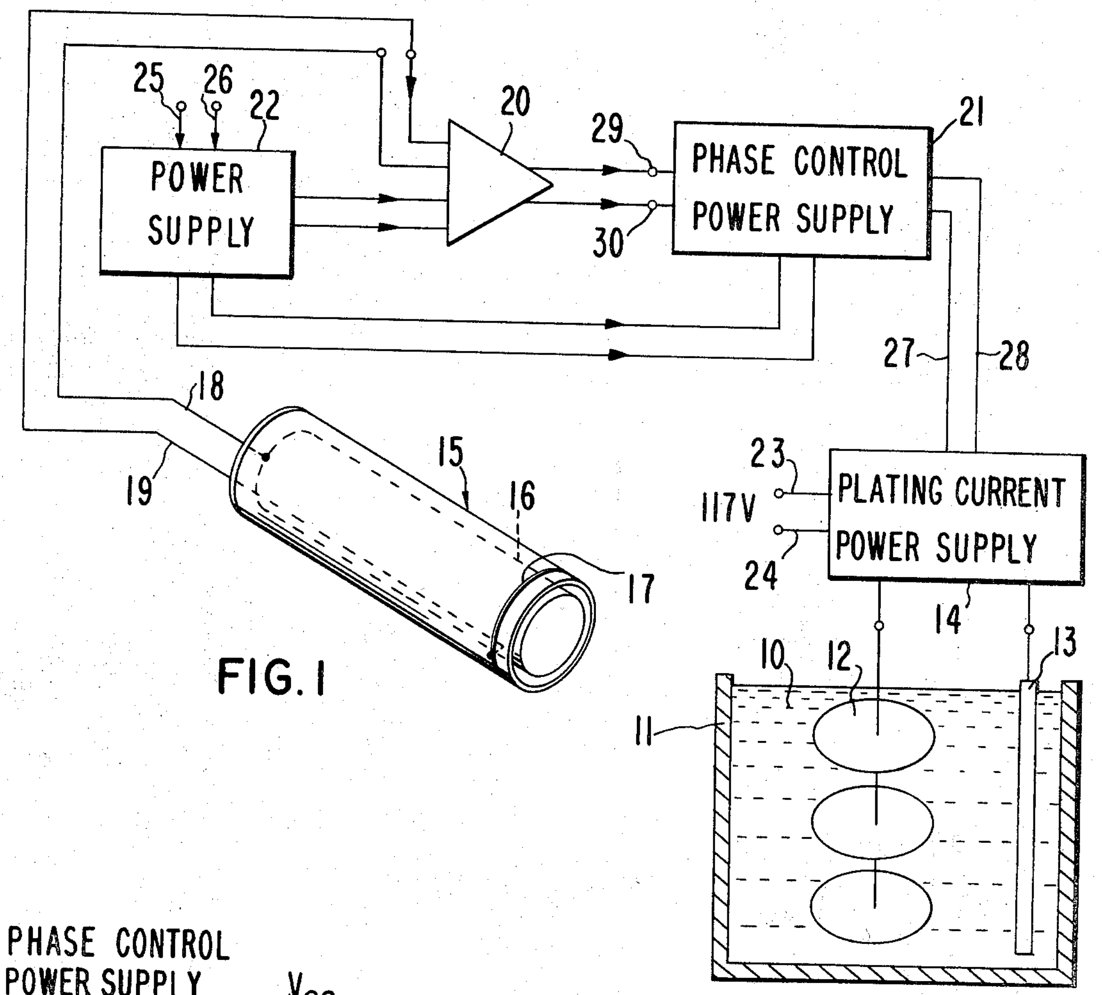

Silver recovery equipment is commonly used for recovery of silver metal from silver ions. Solutions containing silver ions are a by-product of photographic and X-ray processing baths. If the silver in the solution is not recovered as silver metal, a great deal of money passes down the drain. Accordingly, silver recovery equipment has found widespread acceptance throughout the world.

It is necessary to control the recovery process and to stop the process before undesirable side reactions begin. In the past, according to U.S. Pat. 2,110,930, the recovery process was controlled by making an independent measurement of the cathode-anode voltage in order to find the critical voltage at which the undesirable side reactions begin. The cathode-anode voltage was continuously monitored during the process. As soon as the voltage reached the predetermined critical level, the operator manually turns a switch, taking away the plating current.

The above system of the prior art has several disadvantages. First, an operator must be on hand to continually monitor the critical voltage. Second, the manual control on the apparatus must either be completely on or completely off. As the critical voltage is approached, the operator must decide either to leave the apparatus on or turn it off. If left on too long, undesirable side reactions take place. If turned off too soon, a substantial amount of valuable silver metal is never recovered.

It would be much more desirable to have equipment in which plating current is automatically controlled by the concentration of silver ions in the solution. In such apparatus, as the critical level is approached, the plating reaction is slowed down, but not entirely stopped. At the very end of the reaction, when the critical point is finally reached, plating is then completely stopped. However, such control is not possible with apparatus of the prior art, as was described above, which monitors the cathode-anode voltage as its indication of reaction completion.

The subject invention provides a system which turns plating current off gradually as a critical silver concentration is approached. The voltage measured in the system of the invention is not the cathode-anode voltages, as in the prior art, but rather an independent voltage substantially dependent only on the silver ion concentration in the invention. The electrolytic measuring cell of the invention is connected in such a way as to be substantially independent of the voltage on either the cathode or the anode of the plating apparatus.

Briefly, we provide an automatic control for apparatus for the recovery of silver metal from a solution containing silver ions, wherein the apparatus includes a cathode on which the silver is to be plated, an anode, means for supplying plating current between the cathode and anode, comprising: an electrolytic cell at least part of which is adapted to rest in the solution, the cell having output terminals which provide an output voltage related to the concentration of silver ions in the solution but which is substantially unaffected by the voltage between the cell and either the cathode or the anode, or by the anode-cathode voltage itself; a plating current control means having an input means, the control means designed to vary the amplitude of the plating current between cathode and anode inversely proportionally to the magnitude of the input voltage at the input means; and a means connecting the output terminals of the cell to the input means of the plating current control means so that the amplitude of the plating current is varied inversely in proportion to the output voltage of the cell, the variations being substantially independent of the voltage between the cell and either the cathode or the anode of the apparatus, whereby the maximum amount of silver may be plated with minimum interference from undesirable side reactions.

Figure 2:
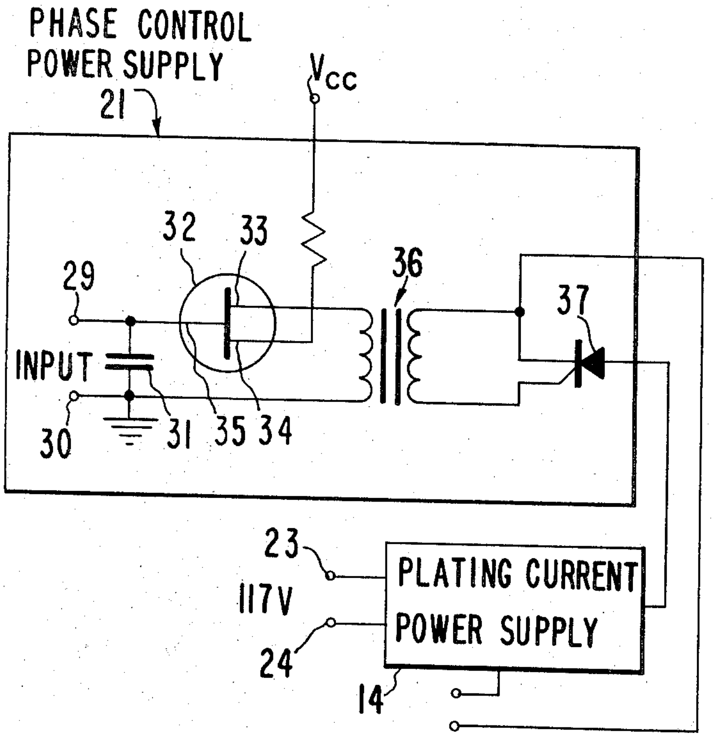

The invention will be better understood by reference to the more detailed description below, referring to the drawing, in which:

FIG. 1 is a block and pictorial diagram of the silver recovery system including the automatic control apparatus of this invention; and FIG. 2 is a schematic circuit diagram of the automatic control circuit of this invention.

Referring to FIG. 1, the solution 10 containing silver ions rests in tank 11. In the tank is a hanging cathode 12 preferably rotatable, and a hanging anode 13. Apparatus of this type is described in U.S. Pat. No. 2,791,555. Normally, the cathode 12 is made of stainless steel plated with silver, and the anode 13 is carbon. The anode and cathode are electrically connected to a plating current power supply 14 for supplying plating current to the apparatus. The control apparatus of this invention is employed to vary the amount of plating current (between cathode and anode) supplied by power supply 14.

The control apparatus of this invention includes an electrolytic cell 15 having an anode 15, preferably carbon, and a silver cathode 17. This electrolytic cell is adapted to have at least part (the end having the cathode 17) rest in solution 10 and to provide an output voltage related to the concentration of components in the solution—mainly the concentration of silver ions. However this output voltage is substantially unaffected by the voltage between cell 15 and either cathode 12 or anode 13 in the plating bath 10, or by the voltage between cathode 12 and anode 13 themselves. Two connecting means, or wires 18 and 19 emerge from cell 15; wire 18 is connected to anode 16 and wire 19 is connected to cathode 17. Wires 18 and 19 are coupled through amplifier 20 to the means for controlling plating current of the invention. This plating current control means includes phase control power supply 21 and plating current power supply 14. Amplifier 20 is a conventional D-C amplifier, for example, of the type which operates on a 24-volt power supply. Such a power supply is shown in FIG. 1 as power supply 22. Power supply 22 also provides the power for phase control power supply 21. Plating current power supply 14, on the other hand, is connected to a conventional 117 volt A-C line through lines 23 and 24. The same line voltage is also connected to power supply 22 through lines 25 and 26. In addition to providing power, the line voltage is synchronized with the phase control power supply.

The phase control power supply means 21 is connected to the plating current power supply 14 through lines 27 and 28. The details of the phase control power supply circuit will be better understood from the schematic circuit diagram of FIG. 2.

The output of amplifier 20 shown in FIG. 1 is connected to the input terminals 29 and 30 of the phase control power supply 21. Amplifier 20 is of the inverting type, so that an increase in voltage from electrolytic cell 15 (FIG. 1) results in an amplified decrease in voltage across terminals 29 and 30 of phase control power supply 21. The input voltage at terminals 29 and 30 charges capacitor 31 at a charging rate dependent upon the voltage magnitude. Capacitor 31 continues to charge until it reaches a level sufficiently high to break down the unijunction transistor 32. With a higher voltage input level at terminals 29 and 30, the time required to charge the capacitor 31 to the breakdown voltage of transistor 32 is shorter. Normally a unijunction transistor breaks down when the voltage across capacitor 31 reaches approximately 75% of the voltage across terminals 33 and 34 of the transistor.

When transistor 32 does break down, capacitor 31 will discharge across terminals 35 and 33 of the unijunction transistor, thus sending a pulse from terminal 35 through terminal 33 across transformer 36. This pulse appearing on the secondary of transformer 36 and thus across the gate-cathode circuit of silicon controlled rectifier ("SCR") 37 turns the SCR "ON" for the remaining portion of the half cycle of the A-C line voltage, repeating similarly on each succeeding half cycle. The portion of the half cycle during which the SCR is turned ON is proportional to the input voltage across terminals 29 and 30. The higher the voltage across terminals 29 and 30, the faster the charging rate of capacitor 31 and thus the sooner transistor 32 breaks down, and the longer the proportion of the line voltage half cycle that the SCR 37 is turned on. Since the amplifier 20 (FIG. 1) is of the inverting type, the higher voltages across terminal 29 and 30 results from a lower output voltage from cell 15 (FIG. 1). Accordingly, the lower the output voltage from cell 15, the larger the proportion of the line voltage half cycle during which SCR 37 is turned on, the longer the proportion of the half cycle during which plating current power supply 14 supplies plating current to the silver recovery equipment, and thus the higher current level which is supplied by power supply 14.

Conversely, as the plating reaction is completed, the output voltage of cell 15 rises. This results in a lower voltage from inverting amplifier 20 (FIG. 1) across input terminals 29 and 30 of the phase control power supply. This lower voltage results in a slower charging of capacitor 31 and a more delayed breakdown of transistor 32. With the more delayed breakdown, SCR 37 is turned on later and thus remains on for a smaller proportion of its cycle. Less plating current is then supplied from plating current supply 14 to the silver recovery equipment.

Finally, when the cell voltage from cell 15 (FIG. 1) becomes sufficiently high and the input voltage across terminals 29 and 30 therefore becomes sufficiently low, capacitor 31 will never charge to a sufficient voltage to break down transistor 32. At that point, SCR 37 is no longer turned on at all and the plating current power supply remains off.

It is very important that the control apparatus of this invention provide a very sensitive measurement of and reaction to changes in the voltage from cell 15. If plating is allowed to continue beyond this critical level, many undesirable side reactions take place. Particularly, a reduction reaction takes place to reduce the thiosulfate ions normally found in the solution to sulfides. These sulfides ruin the solution and precipitate solid silver sulfide. Not only is silver sulfide a messy precipitate, requiring constant cleaning procedures, but the silver in the silver sulfide precipitate cannot readily be recovered and is thus lost for all practical purposes.

On the other hand, if the apparatus shuts off too soon—prior to the plating of substantially all of the silver in the solution on the cathode, the unrecovered silver in the solution is lost. The apparatus of this invention recovers silver at a maximum rate when the silver concentration is high, at an intermediate rate for a very brief time as the silver concentration drops, and finally turns off the plating current completely immediately prior to the point where the undesirable side reactions, such as thiosulfate reduction, occur. It has been found, by way of example, that when the voltage across the electrolytic cell 15 reaches about 0.36 volt, that the recovery reaction is approaching the point where the plating current should be turned off. Generally, the current may be turned off between about 0.26 and 0.38 volt, preferably above about 0.32 volt.

Although the preferred embodiment of the invention illustrated in FIG. 2 uses an SCR 37, it will be appreciated by one skilled in the art that other controlled switches, such as bidirectional switches, called "triacs," may alternatively be employed with appropriate circuit modifications well known in the art. Another alternative control means which may be employed uses a high power transistor to control the plating current. The output signal of amplifier 20 is applied to the base of such transistor, thus directly controlling its emitter-collector current without requiring the previously described phase control system necessary for controlled switches.

Furthermore, other modifications and variations may be made by one skilled in the art in the construction, materials, and circuitry of the invention without departing from its essential spirit and scope. Accordingly, the only limitations to be placed upon the scope of the invention are those expressed in the claims which follow.

What is claimed is:

1. Automatic control for apparatus for the recovery of silver metal from a solution containing silver ions, said apparatus including a plating cathode on which the silver is to be plated, an anode, and a means for supplying plating current between cathode and anode, comprising:

a detecting electrolytic cell having a silver cathode, at least a part of which is adapted to rest in the solution, said cell having output terminals which provide an output voltage directly related primarily to the concentration of silver ions in the solution but which is substantially unaffected by the solution pH, the voltage between said cell and either said cathode or said anode, or by the anode-cathode voltage itself;

a plating current control means having an input means, said control means designed to vary the amplitude of the plating current between cathode and anode inversely proportionally to the magnitude of the input voltage at said input means; and means connecting the output terminals of said cell to said input means of said plating current control means so that the amplitude of the plating current is varied inversely proportionally to the output voltage of said cell, said variations being substantially independent of the voltage between said cell and either said cathode or said anode of said apparatus, whereby the maximum amount of silver may be plated with minimum interference from undesirable side reactions.

2. The automatic control of claim 1 further characterized by said electrolytic cell having a carbon anode.

3. The automatic control of claim 1 further characterized by said electrolytic cell being coupled to said plating current control means through an amplifier.

4. The automatic control of claim 1 further characterized by said plating current control means including a phase control power supply means and a plating current power supply means, the input of said plating control means being coupled to the output of said phase control power supply means, and said plating current power supply means having output terminals adapted to be connected to supply plating current to said apparatus for the recovery of silver metal from a solution containing silver ions.

5. The automatic control of claim 4 further characterized by said phase control power supply means including a controlled switch.

6. The automatic control of claim 5 further characterized by said phase control power supply including a unijunction transistor having input and output terminals, said controlled switch being coupled to said output terminals and being triggered by means of said unijunction transistor.

7. The automatic control of claim 6 further characterized by said phase control power supply including a capacitor coupled across the input terminals of said unijunction transistor.

8. The automatic control of claim 7 further characterized by said phase control power supply means including a controlled switch and a unijunction transistor having input and output terminals, said unijunction transistor having its output terminals coupled to said control switch and its input terminals coupled across a capacitor, the output voltage signal from said electrolytic cell also being coupled across said capacitor, whereby the magnitude of the voltage of said cell controls the charging time of said capacitor, and the charging time of said capacitor in turn controls the phase of said controlled switch.

References Cited

UNITED STATES PATENTS

| | | | |
|---|---|---|---|
| 2,822,324 | 2/1958 | Gaylor et al. | 204—294X |
| 2,832,734 | 4/1958 | Eckfeldt | 204—228X |
| 2,928,774 | 3/1960 | Leisey | 204—228X |
| 3,067,123 | 12/1962 | Huber | 204—228X |

JOHN H. MACK, Primary Examiner

D. R. VALENTINE, Assistant Examiner

U.S. Cl. X.R.

204—294